United States Patent
Lawrenson et al.

(10) Patent No.: US 9,860,963 B2
(45) Date of Patent: Jan. 2, 2018

(54) LIGHTING DEVICE AND A METHOD OF PROTECTING A LIGHTING DEVICE

(71) Applicant: PHILIPS LIGHTING HOLDING B.V., Eindhoven (NL)

(72) Inventors: Matthew John Lawrenson, Bussigny-Pres-de-Lausanne (CH); Julian Charles Nolan, Pully (CH); Alexander Henricus Waltherus Van Eeuwijk, Eindhoven (NL); Hilbrand Vanden Wyngaert, Grobbendonk (BE); William Nathan Chelton, Eindhoven (NL)

(73) Assignee: PHILIPS LIGHTING B.V., Eindhoven (NL)

( * ) Notice: Subject to any disclaimer, the term of this patent is extended or adjusted under 35 U.S.C. 154(b) by 41 days.

(21) Appl. No.: 15/024,220

(22) PCT Filed: Sep. 15, 2014

(86) PCT No.: PCT/EP2014/069573
§ 371 (c)(1),
(2) Date: Mar. 23, 2016

(87) PCT Pub. No.: WO2015/039980
PCT Pub. Date: Mar. 26, 2015

(65) Prior Publication Data
US 2016/0270193 A1    Sep. 15, 2016

(30) Foreign Application Priority Data
Sep. 23, 2013   (EP) ..................................... 13185550

(51) Int. Cl.
*G06Q 10/00* (2012.01)
*H05B 37/02* (2006.01)
(Continued)

(52) U.S. Cl.
CPC ....... *H05B 37/0272* (2013.01); *H04L 9/0891* (2013.01); *H04L 9/3221* (2013.01);
(Continued)

(58) Field of Classification Search
CPC ... H05B 7/0272; H05B 7/0254; H04L 9/0891; H04L 9/3221
See application file for complete search history.

(56) References Cited

U.S. PATENT DOCUMENTS

2003/0021413 A1* 1/2003 Kiiveri .................. H04W 12/08
380/247
2006/0097661 A1 5/2006 Johnsen et al.
(Continued)

FOREIGN PATENT DOCUMENTS

EP    2262350 A1    12/2010
EP    2533615 A2    12/2012
(Continued)

OTHER PUBLICATIONS

Samir Patel, EIC 2800 Search Report, Jun. 22, 2017, Scientific and Technical Information Center (STIC).*

*Primary Examiner* — Tung X Le
*Assistant Examiner* — Raymond R Chai

(57) ABSTRACT

A lighting system (100) and a method of protecting a lighting device of a lighting system against theft are provided. The lighting system comprises a lighting device (110) and at least one other device (170). Both the lighting device and the at least one other device comprises a data storage (116, 176), a controller (114, 174) and a network interface (112, 172). The lighting device additionally comprises a light emitter (118). When the lighting device powers up, the other device transmits a verification value stored in its data storage to lighting device. The lighting device assesses the verification value in relation to a unique value stored in its data storage to check whether the lighting system knows the (Continued)

lighting device. In dependence of the assessment, the lighting device is controlled to operate in a first or in a second operational mode. In a commissioning procedure the other device may receive the verification value for storage in its data storage.

15 Claims, 2 Drawing Sheets

(51) Int. Cl.
*H04L 9/08* (2006.01)
*H04L 9/32* (2006.01)
*H05B 33/08* (2006.01)

(52) U.S. Cl.
CPC ..... *H05B 33/0845* (2013.01); *H05B 33/0857* (2013.01); *H05B 37/0254* (2013.01)

(56) References Cited

U.S. PATENT DOCUMENTS

| | | | | |
|---|---|---|---|---|
| 2006/0150241 | A1* | 7/2006 | Huh | H04L 9/32 726/4 |
| 2008/0320298 | A1* | 12/2008 | De Vaan | G06F 21/34 713/155 |
| 2010/0091686 | A1* | 4/2010 | Rutjes | H05B 37/0272 370/254 |
| 2012/0306621 | A1* | 12/2012 | Muthu | H05B 37/0272 340/8.1 |
| 2012/0312874 | A1* | 12/2012 | Jonsson | G06Q 10/087 235/385 |
| 2013/0036305 | A1* | 2/2013 | Yadav | H04L 63/065 713/168 |
| 2014/0015419 | A1* | 1/2014 | Shah | H05B 33/0803 315/154 |
| 2015/0263861 | A1* | 9/2015 | Kumar | H04B 10/116 713/168 |

* cited by examiner

LIGHTING DEVICE AND A METHOD OF PROTECTING A LIGHTING DEVICE

CROSS-REFERENCE TO PRIOR APPLICATIONS

This application is the U.S. National Phase application under 35 U.S.C. §371 of International Application No. PCT/EP2014/069573, filed on Sep. 15, 2014, which claims the benefit of European Patent Application No. 13185550.4, filed on Sep. 23, 2013. These applications are hereby incorporated by reference herein.

FIELD OF THE INVENTION

The invention relates to lighting devices which comprise a controller for controlling an operation of the lighting device. More in particular, the invention relates to lighting devices which comprise anti-theft protection measures.

The invention further relates to a lighting system which comprises such a lighting device, and a method of protecting a lighting device against theft and a computer program.

BACKGROUND OF THE INVENTION

Products based on Light Emitting Diode (LED) lamps have the potential to have some marked differences compared to those based on other technologies, for example incandescent lamps and compact fluorescent lamps. Relevant potential differences are (i) increased cost of constituent technology, (ii) longer potential lifetime of the lamp and (iii) increased functionality, for example ability to vary color.

Also electronics, and in particular Integrated Circuits (ICs), are decreasing in cost and have increasing capability. This together with an increase in the number and variety of connected devices is fuelling a market desire to have products with increased functional capabilities in both dwellings and offices. Lamps are well placed to fulfill some of this market need, and are likely to include an increasing level of technology in the future.

These factors combined means it is likely that at least some categories of the market for LED lamps will have a higher Average Selling Price (ASP) than historic lamps.

The combination of higher ASP with the fact that lamps are portable, typically not secured in a sophisticated manner and are often indistinguishable at first glance means it is likely that LED lamps will become a target for thieves. There is a need for anti-theft measures in such LED lamps.

Published patent application US2006/0097661A1 discloses a high intensity discharge (HID) assembly which comprises ballast circuits which includes a micro-controller and a HID headlamp. The high intensity discharge assembly is for use in a vehicle. In order to deter theft of the HID assembly from a vehicle, the micro-controller communicates with the vehicle, checks the Vehicle Identification Number (VIN) of the vehicle. If the micro-controller does not recognize the VIN, it causes the HID headlamp to operate in a flickering power output mode.

SUMMARY OF THE INVENTION

It is an object of the invention to provide a lighting device with improved anti-theft measures.

A first aspect disclosed herein provides a lighting system. A second aspect provides a method of protecting a lighting device against theft. A third aspect provides a computer program. Advantageous embodiments are defined in the dependent claims.

A first aspect of this disclosure provides a lighting system comprising a lighting device and at least one other device. The lighting device comprises a light source, a first controller, a first data storage and a first network interface. The light source is for emitting light. The first controller operates the lighting device and controls a light emission of the light source. The first controller is configured to operate the lighting device in a first operational mode and to operate the lighting device in a second operational mode. The first data storage storing an unique value associated to the lighting device. The first network interface connects to a network and for allowing the first controller to communicate with the at least one other device. The at least one other device comprises a second data storage, a second controller and a second network interface. The second data storage stores verification values which relate to devices of the lighting system. The stored verification values represent a list of devices that are known by the lighting system. The second network interface connects to the network and allows the second controller to communicate with devices being connected to the network. The first controller is configured to, at powering up of the lighting device, i) receive via the first network interface a verification value from the at least one other device, ii) assess the verification value in relation to the unique value stored in the first data storage for determining whether the lighting device is known to the lighting system, and iii) control the lighting device in the first operational mode or in the second operational mode on basis of the assessment. The second controller is configured to a) determine whether the lighting device is powering up and, when the lighting device is powering up, to b) retrieve the verification value of the lighting device from the second data storage and c) transmit the retrieved verification value to the lighting device via the second network interface.

In an embodiment, the first operational mode comprises operating the lighting device in accordance with full functionality of the lighting device, and wherein the second operational mode comprises operating the lighting device in accordance with a reduced functionality.

The lighting system provides effective measures to prevent theft of the lighting device. The lighting device may be controlled in the first operational mode when, based on the assessment it has been concluded that the lighting device is known to the lighting system and the lighting device may be controlled in the second operational mode when the lighting device is not known the lighting system. Operation of the lighting device in the second operational mode is an anti-theft measure because, when the lighting device would be stolen and connected to another lighting system to which it is not known, the lighting device would not operate according to its full functionality, and, thus, it would not be worth the trouble of stealing the lighting device. The at least one other device is the device at which the knowledge about the lighting devices of the lighting system is stored in its second data storage. The interaction between the at least one other device and the lighting device results in the reception of the verification value at the lighting device and may result in the controlling of the lighting device in the first operational mode. When the lighting device is stolen it shall most probably not receive anymore a correct verification value which might result in the controlling of the operation of the lighting device in the second operational mode. These measures discourage theft of such lighting devices as it is not worth the effort of stealing such devices because of their reduced functionality when operated in light system to which they are unknown. If the lighting device is not stolen but placed in another lighting system with a further device that has characteristics of the at least one other device, the further device must receive a value to store in its data storage such that it may transmit a correct verification value to the lighting device. Thus, it is possible to place a lighting device in other lighting system, but only when one is able to store a value in the data storage of the further device. Thus, the lighting system provides a flexibility to use the lighting device in other lighting systems as well. It is to be noted that someone who wants to steal the lighting device such that he can use it in another lighting system, he must also steal a value that is recognized by the lighting device as a correct verification value. Thus, the lighting system makes it more difficult to successfully steal the lighting device. The other device may also be a lighting device. The other device may also comprise a luminaire or lighting unit configured to power the light source, such as a luminaire or lighting unit configured to host the light source. Operation of a stolen light source in such luminaire or lighting unit may be prevented with the invention.

In an embodiment, the first data storage is a non-volatile memory and/or the second data storage is a non-volatile memory.

In an embodiment, the first controller is further configured to, while the lighting device is being commissioned to operate in the lighting system, transmit the unique value or a value that is directly obtained from the unique value to the at least one other device and the second controller is further configured to receive via the second network interface the transmitted unique value or the value that is directly obtained from the unique value and store it in the second data storage. In accordance with this optional embodiment, the lighting device provides information to the at least one other device of the lighting system such that, lateron, when the lighting device is powering up, the at least one other device (or the lighting system) may transmit a value to the lighting device to proof that the lighting device is known in the lighting system. The transmitted value may directly obtained from the unique value by means of, for example, a function or an encryption technology.

In an embodiment, the lighting system further comprises a commissioning device. The first controller is further configured to store in its data storage a secret (a code, or a key, or a password) and the first controller is further configured to, while the lighting device is in the commissioning procedure, i) communicate with a commissioning device to receive proof that the user of the commissioning device or the commissioning device itself knows the secret, and, only when the proof has been received, ii) transmit the unique value or a value that is directly obtained from the unique value to the at least one other device in the lighting system. This optional embodiment prevents that the lighting device transmits in every commissioning (or re-commissioning) procedure for every lighting system in which it has been installed, the unique value or the value that has been derived from the unique value to the at least one other device. Thus, this provides additional security in the case that the first controller itself is responsible for providing the unique value or the value that is derived from the unique value to the at least one other device. The additional security is based on the fact that the user has to know the secret or that a specific commissioning device must be used in which the secret is (pre-)programmed.

In an embodiment, the first controller is configured to change the stored secret to a new secret in response to receiving a request from a user device which provide the stored secret and which provides the new secret. This embodiment allows the owner of the lighting device to change the secret such that it is better memorable for him, or to change the secret when he thinks that someone has stolen the secret.

In an embodiment, the first controller is configured to, when the lighting device is installed for the first time in the lighting system, to automatically start the commissioning procedure. During the commissioning procedure the first controller provides the unique value or the value that is directly obtained from the unique value to the at least one other device. For example, a specific Boolean setting in the first data storage indicates that the lighting device has not yet been used in a lighting system and when this is indicated, the first controller automatically provides the unique value or the value that is directly obtained from the unique value to the at least one other device of the lighting system and subsequently resets the Boolean setting. The manufacturer may set this specific Boolean setting at the value which indicates that the lighting device has not yet been used in a lighting system before. It is to be noted that this optional embodiment relates to the first installation in the lighting system after the moment in time that the lighting device has been sold to a customer.

In an embodiment, the lighting system further comprises a commissioning device, wherein the commissioning device comprises a user interface for receiving, while the lighting device is in the commissioning procedure, a secret from a user and the commissioning device comprises a third network interface for transmitting the received secret code or the secret key to the lighting device. Alternatively, the secret has been stored in a third data storage of the commissioning device and the stored secret is transmitted to the lighting device when the lighting device is in the commissioning procedure. Providing a secret to the lighting device may be used to trigger an action of the lighting device in which it provides its unique value or a value that is derived from the unique value to the at least one other device. This embodiment provides the user (and, thus, the owner of the lighting device) the possibility to move his lighting device to another lighting system which comprises a further device that has similar characteristics as the at least one other device of the lighting system of this disclosure. In this another lighting system the unique value or the value that is directly obtained from the unique value may be stored in the further device when the user provides the secret. Someone who steals the lighting device and puts it in another lighting system does not know the secret and can, therefore, not trigger the commissioning of the lighting device in the another lighting system. Thus, the lighting device is well protected against theft.

In an embodiment, the lighting system comprises a network or a central device. The network has a network identity or the central device has a device identity. The first controller is further configured to store in the first data storage an unique network value which relates to an identity of the network or to an identity of a central device of the lighting system and the first controller is configured to, while the lighting device is powering up, i) receive via the first network interface a received network value, ii) assess the received network value in relation to the unique network value for determining whether the lighting device the lighting system, and ii) control the lighting device in the first operational mode or in the second operational mode on basis of the assessment of the verification value and on basis of the assessment of the received network value. Thus, in this optional embodiment, compared to the first embodiment of this document, an additional reverse check is introduced as well. It is not only checked whether the lighting system knows the lighting device, but it is also checked whether the lighting device knows the lighting system (which is done via checking the network identity or the central device identity). This provides additional anti-theft measures. Often, when a device is powering up and connects to a network, the network, or a central device (for example, a router, or a DHCP server) identifies itself. When, for example, during a commissioning procedure, the lighting device got knowledge about the network, the lighting device is able to check during every subsequent powering up procedure whether it is still in the same network or it is installed in another—not known—network. When the assessment of the verification value indicates that the lighting system knows the lighting device and when the assessment of the received network value indicates that the lighting device knows the network of the lighting system, the lighting device is controlled into the first operational mode and, otherwise, in the second operational mode.

In an embodiment, the received network value is one of a network name, an address used to identify the network (for example, a sub-network identification address, or a groups address belonging to the network), a name of a central device and an address of the central device.

In an embodiment, the first controller of the lighting device is further configured to, while the lighting device is in a commissioning procedure for commissioning the lighting device to the lighting system, i) receive via the first network interface the unique network value, and ii) store the unique network values in the first data storage. However, it is to be noted that the invention is not limited to storing the unique network value only during the commissioning procedure—as indicated above, the lighting device may receive the unique network value every time that it connects to the network after a period of inactivity (when it was, for example, switched off) and it might store the received unique network value at one or more of these moments in time.

In an embodiment, the first controller of the lighting device is further configured to, while the lighting device is powering up, transmit via the first network interface information to the at least one other device that the lighting device is powering up. The information may comprise a request to provide a verification value in response to the reception of the information. Thus, when the lighting device starts up, the at least one other device receives the information of the lighting device powering up. Subsequently the at least one other device transmits a particular verification value from its data storage to the lighting device which allows the lighting device to assess this verification value with respect to the unique value stored in the first data storage of the lighting device.

In an embodiment, the lighting system comprises a second other device. The second other device comprises a third data storage, a third controller and a fourth network interface. The third data stores is for storing verification values which relate to devices of the lighting system, the stored verification values representing a list of devices known by the lighting system. The fourth network interface is for connecting to the network and for allowing the third controller to communicate with devices being connected to the network. The second controller and the third controller are both configured to synchronize the list of stored verification values in, respectively, the second data storage and the third data storage. In other words, the stored lists of verification values comprise the same information and, as such, the third data storage comprises a backup of the list stored in the second data storage. It is advantageous to have a backup available in the lighting system because, when the at least one other device is broken or stolen, the lighting system is unable to prove to the lighting device that the lighting device is known by the lighting system. It is to be noted that the second other device may be a lighting device as well which comprises a light source for emitting light, but the second other device may also be a central device, or a router device of the lighting system.

In an embodiment, the third controller is further configured to a) determine whether the lighting device is powering up and, when the lighting device is powering up, b) retrieve the verification value of the lighting device from the third data storage and c) transmit the retrieved verification value to the lighting device via the third network interface. According to this embodiment, the at least one other device and the further device provide the verification value to the lighting device. Thus, there is a redundancy in the system which prevents that the lighting device does not receive the verification value when the at least one other device is broken or stolen.

In an embodiment, if the lighting device is known to the lighting system, than the verification value is substantially equal to the unique value, or the verification value is directly obtainable from the unique value. Thus, in a commissioning procedure, or during an installation procedure, the lighting device provides a unique value to the at least one other device of the lighting system which can later on return the unique value or a value that is directly obtained from the unique value to the lighting device, in particular at powering up of the lighting device. This embodiment makes it relatively easy for the lighting device to check whether the lighting device is already known by the lighting system because the assessment of the verification value and the stored unique value comprises a relatively simple comparison. In case the verification value is not identical to the unique value but is directly obtainable from the unique value, this may be realized and assessed by means of a function (for example, a hash function) or by means of a way of encryption on the basis of a key. The used function or used key may be predefined, or may be defined during a commissioning or an installation procedure. When the verification value is not exactly the unique value but is directly obtained from the unique value, the unique value is not transmitted via the network of the lighting system which provides additional security with respect to hackers who want to know the unique value. Using a function or a key also provides flexibility with respect to changing the key or the function when, for example, an attack was detected in which a malicious party tried to steal information with respect to the value that is directly obtainable from the unique value. Also, in another embodiment, the key or the function is changed on a regular basis to provide additional security.

In an embodiment, the used encryption technology or function to obtain a value directly from the unique value may have the characteristic feature that applying the function or the encryption technology to a specific unique value always results in the same value. Only changing the key or changing the function results in another obtained value.

In an embodiment, the lighting device may be configured to apply a zero-knowledge protocol together with at least one other device that is being coupled to the network of the lighting system and the verification value is a value which is part of the communication of the zero-knowledge protocol.

The zero-knowledge protocol is used to proof that the at least one other device has knowledge that relates to the unique value. Thus, the other device knows the unique value or knows a value that is directly obtained from the unique value and the zero knowledge protocol may be used to proof that the at least one other device knows one of these values without transmitting the values directly from the at least one other device to the lighting device. Known zero-knowledge protocols may be used.

In an embodiment, the reduced functionality comprises at least one of: a limited range of emitted light intensities compared to the range of light intensities which the lighting device may emit when operating according to its full functionalities, a limited range of emitted colors of light compared to the range of colors of light which the lighting device may emit when operating according to its full functionalities, a specific pattern of consecutive emitted light intensities, a specific pattern of consecutive emitted colors of light, no light emission, limited access to the first data storage or another memory of the lighting device, a reduced operational speed of a processing unit of the lighting device, etc. Thus, when the lighting device operates in the second operational mode, it emits, for example, only dimmed light or only very bright light. Alternatively, or in addition, the color of the emitted light is a specific color (or color temperature) which cannot be changed. Furthermore, it might be that the lighting device, in the second operational mode, starts to emit light according to a specific light intensity and/or color pattern. For example, the lighting device may start blinking or flickering when operating in the second operational mode, or the color of light continuously changes from white to a specific color of light and vice versa. In other embodiment, the reduced functionality may also relate to other components of the lighting device, such as the first data storage or the first controller. For example, access to the first data storage may be limited in the second operational mode which prevents that malicious parties (who have, for example, stolen the lighting device) are able to read the unique value, the earlier discussed secret, or changes the unique value or the earlier discussed secret. In the second operational mode, the operational speed of the first controller may be reduced such that the lighting device operates sub-optimal.

According to another aspect, a method is provided for protecting a lighting device in a lighting system against theft. The lighting system comprises the lighting device and at least one other device and the lighting device is connectable to the at least one other device via a network. The method comprises the steps of: i) obtaining knowledge at the at least one other device that the lighting device is powering up, ii) retrieving from a second data storage of the at least one other device a verification value of the lighting device, iii) transmitting the retrieved verification value via the network to the lighting device, iv) receiving the transmitted verification value at the lighting device, v) assessing the received verification value in relation to a unique value for determining whether the lighting device is known to the lighting system, the unique value is associated with the lighting device and is stored in a first data storage of the lighting device, vi) controlling the lighting device in a first operational mode or in a second operational mode on basis of the assessment of the received verification value.

The method described above mainly relates to the actions that are undertaken by the lighting device of the lighting system. It is to be noted that additional methods may be provided which relate to the actions that are performed by additional features of the lighting device, the other device of the lighting system or the commissioning device according to one of the embodiments disclosed above.

According to further aspect, a computer program is provided which comprises instructions for causing a processing system to perform the above described method. The computer program may be embodied on a computer readable medium.

These and other aspects of the invention are apparent from and will be elucidated with reference to the embodiments described hereinafter.

It will be appreciated by those skilled in the art that two or more of the above-mentioned options, implementations, and/or aspects of the invention may be combined in any way deemed useful.

Modifications and variations of the lighting device, the lighting system, the method, and/or of the computer program product, which correspond to the described modifications and variations of the device and/or the system, can be carried out by a person skilled in the art on the basis of the present description.

Figure 1:
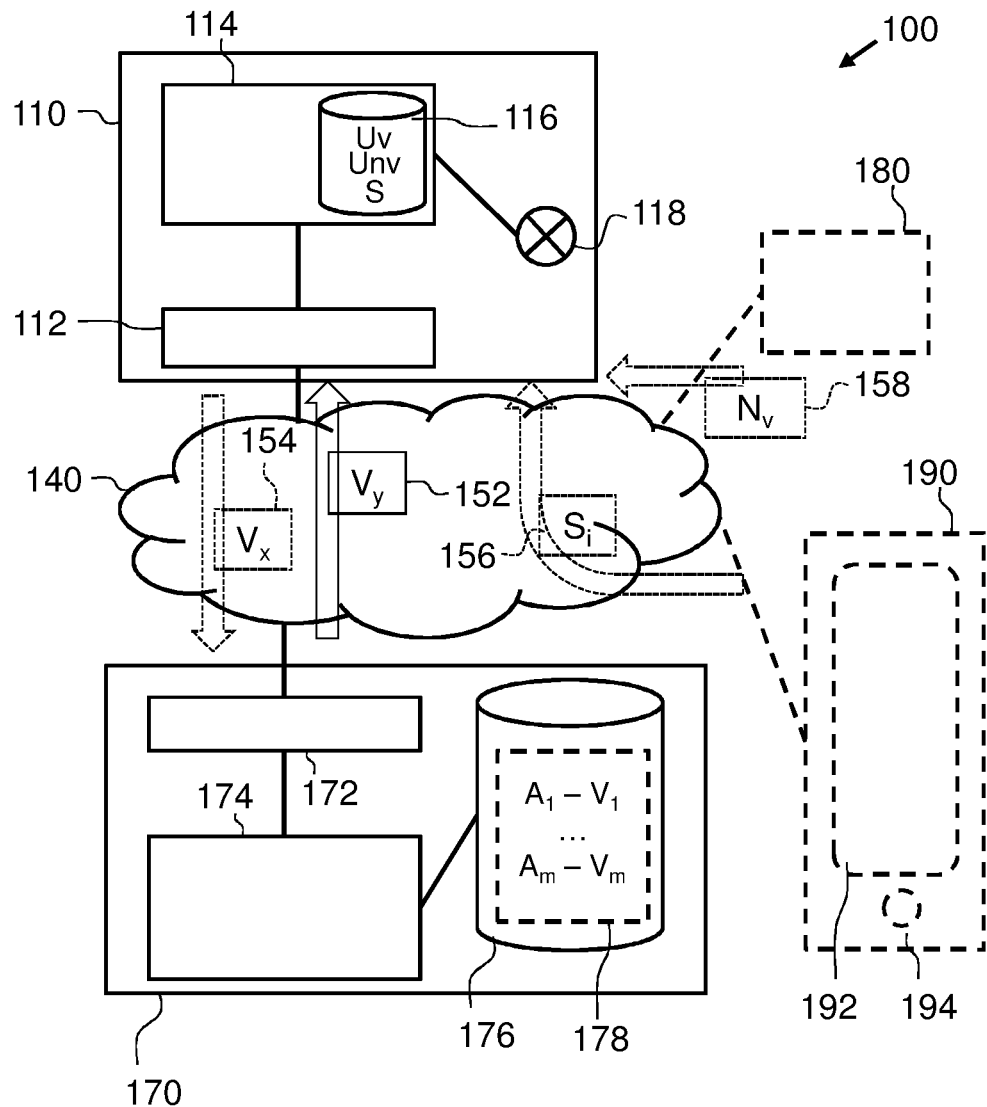
FIG. 1 schematically shows an embodiment of a lighting system.

It should be noted that items denoted by the same reference numerals in different Figures have the same structural features and the same functions, or are the same signals. Where the function and/or structure of such an item have been explained, there is no necessity for repeated explanation thereof in the detailed description.

The Figures are purely diagrammatic and not drawn to scale. Particularly for clarity, some dimensions are exaggerated strongly.

DETAILED DESCRIPTION

A first embodiment is shown in FIG. 1. FIG. 1 shows an embodiment of a lighting system 100. The lighting system 100 comprises a lighting device 110. The light system 100 further comprises another device 170 and a network 140. The lighting system 100 may optionally comprise a commissioning device 190 and/or a central network device 180. In the following of this detailed description characteristics of the lighting device 110 are discussed first. The discussion of the lighting device 110 is followed by discussions of other devices of the lighting system 100.

The lighting device 110 comprises a light source 118, a controller 114 and a network interface 112.

The light source 118 is for emitting light and is configured to emit, in response to a control signal, a specific light. The light source 118 may be capable to emit different colors of light depending on the received control signal and may be capable to emit different intensities of light depending on the received control signal. The light source may comprise a light emitter driving circuit to drive one or more light emitters. The light emitters are, for example, solid state light emitters such as Light Emitting Diodes (LEDs).

The network interface 112 is for connecting to the network 140 of the lighting system 100 and is for providing to the controller 114 a communication channel to other devices, in other words, a possibility to communicate with other devices of the lighting system 100. The network 140 may be based on a wireless communication technology, such as Wifi, Zigbee, IPv6 over Low power Wireless Personal Area Networks (6LowPAN), etc. The network 140 may also be based on a wired network, such as a wired Ethernet, or a network which uses the power infrastructure, etc. The network interface 112 is configured to connect to and communicate via one of the above discussed network technologies. In another embodiment, the network interface 112 is capable of connecting to different types of networks. For example, the network interface 112 comprises a sub-interface for connecting to a wired Ethernet network and another sub-interface for connecting to a wireless technology. These networks may also be used by a device which is used to configure the lighting device 110, or may, for example, be used by the commissioning device 190 for providing commissioning information to the lighting device 110.

The lighting device 110 also comprises a controller 114 which is coupled to the network interface 112 and to the light source 118. The controller 114 comprises a data storage 116. The data storage 116 may also be a separate component of the lighting device 110 and the controller 114 may be configured to access the data storage 116.

The data storage 116 at least stores a unique value Uv which is associated with the lighting device. "Associated with" means that this value belongs to the lighting device. "Unique" means in the context of this document that no other device in the lighting system 100 has an associated value which is equal to the unique value Uv stored in the data storage 116. For example, the unique value may be pre-programmed in the lighting device 110 at manufacture of the lighting device 110, such as a serial number. In another embodiment, the lighting device 110 may be configured by means of a configuration device and the configuration device may assign the unique value Uv.

The controller 114 is configured to receive via the network interface 112 a verification value. The verification value is, for example, a value $V_y$ that has been transmitted by the other device 170 in a data packet 152. The controller is configured to assess the verification value in relation to the unique value to determine whether the lighting device 110 is known to the lighting system 100. That is, when the verification value relates to the stored unique value Uv, then the lighting device 110 is known to the lighting system 100. The verification value may be an exact copy of the unique value Uv, or a value that has been derived from the unique value. When the verification value is derived from the unique value Uv, it may be the result of a function of the unique value Uv, for example, a hashing function, or of an encryption technology that is based on a secret key. In case the verification value is derived from the unique value Uv, the controller 114 has knowledge about how the function or encrypting key used. It might also be possible that in a commissioning process, the controller 114 itself generated a verification value that is obtained from the unique value Uv and provided the generated verification value to the other device 170 for later use. In the assessing of the verification value, the controller 114 compares the verification value with the unique value Uv and optionally uses in such a comparison the function or encryption technology.

The controller 114 is able to determine that the lighting system 100 knows the lighting device 110 when the verification value is equal to the unique value Uv, or when the controller 114 is capable to relate a value that is directly obtained from the unique value Uv to the verification value. In another embodiment, the controller 114 of the lighting device 110 and the other device 170 are capable of executing a zero-knowledge protocol. A zero-knowledge protocol is a protocol that might be used to proof that the other device 170 knows a value that is equal to the unique value Uv, or knows a value that is directly obtained from the unique value Uv, without revealing this value. Thus, the verification value may also be a value that has been received in the context of the zero-knowledge protocol. Known zero-knowledge protocols may be used.

The controller 114 is further configured to assess the verification value in relation to the unique value Uv and, when the controller 114 has determined that the lighting system 100 knows the lighting device 110 or does not know the lighting device 110, control the lighting device to operate in a first operational mode or in a second operational mode in dependence of the assessment. When the controller 114 determines that the lighting system 100 knows the lighting device 110, the lighting device 110 is controlled to operate in the first operational mode. When the controller 114 determines that the lighting system 110 does not know the lighting device 110, the lighting device 110 is controlled to operate in the second operational model. In the first operational mode, the lighting device 110 is not able to operate according to its full functionality. Full functionality relates, for example, to the capability to emit light in a range of light intensities, or the capability to emit light within a color range, or the capability of the lighting device to be controlled by a user, etc. as intended in the original specifications of the lighting device. In the second operational mode the functionality of the lighting device is limited. This may imply that lighting device 110 is not capable of emitting light within the full range of possible light intensities, or is not capable of emitting light within the full range of possible colors of light. The second operational model may also comprises the situation in which the lighting device does not emit any light at all. In another embodiment, the lighting device starts to emit specific visible patterns of light, such as alternating intensities of light or alternating colors of light when controlled in the second operational mode. Such visible patterns of light may be interpreted by the user as a blinking light, or as a lighting device which emits a specific visible signal. The second operational mode is thus a mode in which the lighting device 110 operates in an annoying way or at least not very useful way. In other words, when the lighting device 110 is stolen and used outside the lighting system 100, the lighting device 110 is operated in such a way that it becomes substantially useless or worthless. The described embodiments therefore discourage theft of such lighting devices as it is not worth the effort of stealing such devices because of their reduced functionality when operated in light system to which they are unknown.

The other device 170 of the lighting system 100 comprises a further data storage 176, a further network interface 172 and a further controller 174. The further network interface 172 is, in line with the above discussed network interface 112 of the lighting device, configured to connect the other device 170 to the network 140 of the lighting system 100 and to allow the further controller 174 to communicate with other device of the lighting system 100, such as to communicate with the lighting device 100.

The further data storage 176 stores values $V_1 \ldots V_m$ that relate to specific 1 . . . m lighting devices of the lighting system 100, of which lighting device 110 is one example. In the further data storage 176, the values $V_1 \ldots V_m$ may be coupled to a network address $A_1 \ldots A_m$ or ID of the specific lighting device to which the respective values $V_1 \ldots V_m$ belong. Thus, the further data storage 176 may store pairs of two data field, wherein a first data field comprises a value that identifies a specific lighting device, such as addresses $A_1 \ldots A_m$, and a second data field comprises the respective value $V_1 \ldots V_m$ that is related to the corresponding lighting device. The further data storage 176 may use a database technology to store the information, or the information may be stored in a table, or may be stored in any other appropriate way. It is to be noted that in FIG. 1 the further data storage 176 is drawn separate of the further controller 174, but, in another embodiment, the further data storage 176 is comprised by the further controller 174.

The further controller 174 is configured to determine whether a lighting device is powering up and, when in particular the lighting device 110 is powering up, the further controller 174 retrieves a value from the further data storage 176 and transmits the retrieved value as a verification value to the lighting device 110 via the further network interface 172 and the network 140. Determining whether the lighting device 110 is powering up may be realized by using one of the subsequent different techniques: a) polling the lighting devices and requesting the status of the lighting devices (which implies that the lighting device 110 is configured to receive such polling message and transmit an appropriate answer back), b) receiving from the lighting device 110 a message that it is powering up which may also comprise a request to provide an appropriate value for indicating whether the lighting device 110 is known to the lighting system 100 (which implies that the lighting device 110 is configured to transmit to the other device 170 a message when it is powering up), c) receiving information from, for example, a central device 170 being coupled to the network 140 that the lighting device 110 became live very recently (e.g. when the central device is a DHCP server, the lighting device may request a network address at the DHCP server when powering up), and d) analyzing the network 140 traffic to see whether lighting device, and particularly lighting device 110, announce their presence to the network 140 after a period of inactivity. Other appropriate techniques to obtain information about the starting-up status of the lighting device 110 may be used as well. When the further controller 174 knows that the lighting device 110 is powering up, it may also obtain a reference ID, or an address, of the lighting device 110 such that it may select from the further data storage 176 the value $V_1 \ldots V_m$ associated with the lighting device 110. The further controller 174 sends, for example, a request to the further data storage 176 which comprises the obtained reference ID or the address.

In FIG. 1 the other device 170 is drawn separately from a central device 180 of the lighting system 110. However, in an embodiment, these two device may be combined in a single device and sharing components that are present in both devices, such as a network interface and a controller. In another embodiment, the other device 170 also comprises a light source for emitting light in dependence of a control signal received from the further controller 174. Thus, the other device 170 may also be a lighting device.

The other device 170 needs to obtain knowledge about lighting devices in the lighting system 100, especially of the presence of the lighting device 110 in the lighting system 100, and needs to obtain response values for storage in the further data storage 176. In a practical embodiment, a commissioning procedure is used to install the lighting device 110 in the lighting system 100. Often, in large buildings, offices, schools, etc., the lighting system 100 is centrally controlled which requires that some device in the lighting system 100, for example central device 180, has knowledge about the lighting device 110 present in the lighting system 100. Often, a commissioning procedure is used to install the lighting device 110 in the lighting system 100 and to inform the lighting system 100 of the presence of the lighting device 110. Traditionally, informing the lighting system 100 of the presence of the lighting device 110 comprises providing information to the lighting system about the position of the lighting device 110 and optionally providing information about the capabilities of the lighting device 110. In accordance with an embodiment of the invention, the lighting device 110 is also able to provide the unique value Uv, or a value directly obtained from the unique value Uv, to the other device 170 of the lighting system 110 during the commissioning procedure. For example, the lighting device 110 transmits, in a data packet 154, a value $V_x$ to the other device 170. The other device 170 is configured to receive such a data packet 154 during the commissioning procedure and is further configured to store the value $V_x$ in the further data storage 176, optionally together with an address $A_x$ of the lighting device 110.

In such a commissioning procedure, a commissioning device 190 may be used. A commissioning device 190 is often used to provide user input to the different devices in the lighting system 100 and to initiate, for example, the commissioning procedure. The commissioning device 190 may be a dedicated device, or may be a general purpose device (such as a mobile phone which comprises input and output means) which runs a specific computer program that comprises instructions for causing a processor system of the general purpose device to perform steps of the commissioning procedure. In FIG. 1 the commissioning device 190 is schematically drawn as a mobile phone which comprises, for example, a touch sensitive display 192 and a button 194 for user interaction.

In particular, in the context of the current disclosure, the commissioning device 190 might have an important role in providing the unique value Uv or the value that is directly obtained from the unique value Uv from the lighting device 110 to the other device 170. In an embodiment, the lighting device 110 stores in its data storage 116 a secret key S. The lighting device 110 is configured to only transmit the unique value Uv or the value that is directly obtained from the unique value Uv to the other device 170 when it receives from the commissioning device 190 a value that directly relates to the stored secret key S. For example, the commissioning device 190 may transmit in a data packet 156 via the network 140 a secret value $S_i$ to the lighting device 110 for allowing the lighting device 110 to assess whether the commissioning device 190 (or a user of the commissioning device 190) knows the stored secret key S. Thus, when such a data packet 156 is received during the commissioning procedure, the controller 114 of the lighting device 110 assesses the received secret value $S_i$ against the stored secret key S, and when the controller 114 is able to proof that the commissioning device 190 (or the user of the commissioning device 190) knows the stored secret key S, the unique value Uv or the value that is directly obtained from the unique value Uv is transmitted to the other device 170.

In an embodiment, the stored secret key S may be preprogrammed in the lighting device 110 by the manufacturer of the lighting device and, is additionally provided separately, for example, in writing, to the buyer of the lighting device 110 such that the buyer is able to provide the secret key to the commissioning device 190.

The commissioning device 190 may run a specific application (being embodied in a computer program) which requests the user of the commissioning device 190 to provide a secret key via the input means of the commissioning device 190 (which is, e.g., the touch sensitive screen 192) after which the application transmits the inputted secret key to the lighting device 110 via the network 140.

It is to be noted that the commissioning device 190 is, in the example of FIG. 1, coupled to the lighting device 110 via the network 140. In another embodiment, the commissioning device 190 may also be coupled to the lighting device 110 via another network or via a direct cable connection.

In an embodiment, the data storage 116 of the controller 114 of the lighting device 110 may also store a unique network value Unv. This unique network value Unv is a value that directly relates to the network 140 of the lighting system 100. The unique network value Unv is sort of identification code of the network 140. In an embodiment, this is a unique name of the network, a unique group address used to address messages to all device of the network 140, or a common part of the network addresses of all devices connected to the network 140 (e.g. in a network with a hierarchical network addressing scheme). Alternatively, the network 140 may comprise a central device 180 which is, for example, a router to another network, or a central server, etc., and the unique network value Unv is a name or an address of the central device 180. In an embodiment, during each startup of the lighting device 110, the lighting device 110 receives a network related value $N_v$, for example from the central device, in a data packet 158, and, when the lighting device 110 is powering up, the received network related value $N_v$ is assessed in relation to the stored unique network value Unv to determine whether the lighting device 110 already knows the network 140 and, thus, knows the lighting system 100. If, in line with previously discussed embodiments, the lighting device 110 is known by the lighting system 100 and, in accordance with this specific embodiment, the lighting device 110 further knows the network 140, the lighting device 110 is controlled in the first operational mode, and, otherwise, in the second operational mode. Thus, only when the lighting device 110 concludes that both the lighting device 110 and the lighting system 100 know each other, the lighting device 110 is able to operate according to its full functionality. In this particular embodiment, the lighting device 110 needs to obtain knowledge about the identity of the network (and, thus, the lighting system) it is initially installed in such that it can store the unique network value Unv as its original network. This may be done during the commissioning procedure as discussed above. During the commissioning procedure, the lighting device 110 may request the network 140 or the central device 180 to provide the unique network value Unv. In another embodiment, when the lighting device 100 is manufactured, a specific Boolean setting in the data storage 116 is set to a specific value which indicates that the lighting device 110 is not yet used/installed in a particular lighting system. At initial powering up, the controller 114 of the lighting device 110 reads the value of the specific Boolean setting and if the Boolean setting indicates that the lighting device 110 was not used/installed before in a particular lighting system, the lighting device 110 may automatically perform at least one of the subsequent actions: i) obtain the unique network value Unv (e.g. by contacting the central device 180 or analyzing the network traffic to determine a network name or address) and store the unique network value in the data storage 116, and ii) automatically transmit the unique value Uv, or the value that is directly obtained from the unique value Uv, to the other device 170. Thereafter the Boolean setting is switched to another value which indicates that the lighting device 110 has been installed and/or used in a particular network system such that the above actions are not anymore performed automatically.

The lighting system 100 may also comprise a further device (not shown) which also comprises a data storage for storing verification values which relate to devices of the lighting system, the stored verification values representing a list of devices known by the lighting system, a controller, and a network interface for connecting to the network and for allowing the third controller to communicate with devices being connected to the network. The further controller 174 of the other device 170 and the controller of this further device may be configured to synchronize the lists of devices known by the lighting system. The further device and the other device 170 may exchange via the network 140 synchronization messages such that the data stored in the further device matches the data stored in the other device 170.

Figure 2:
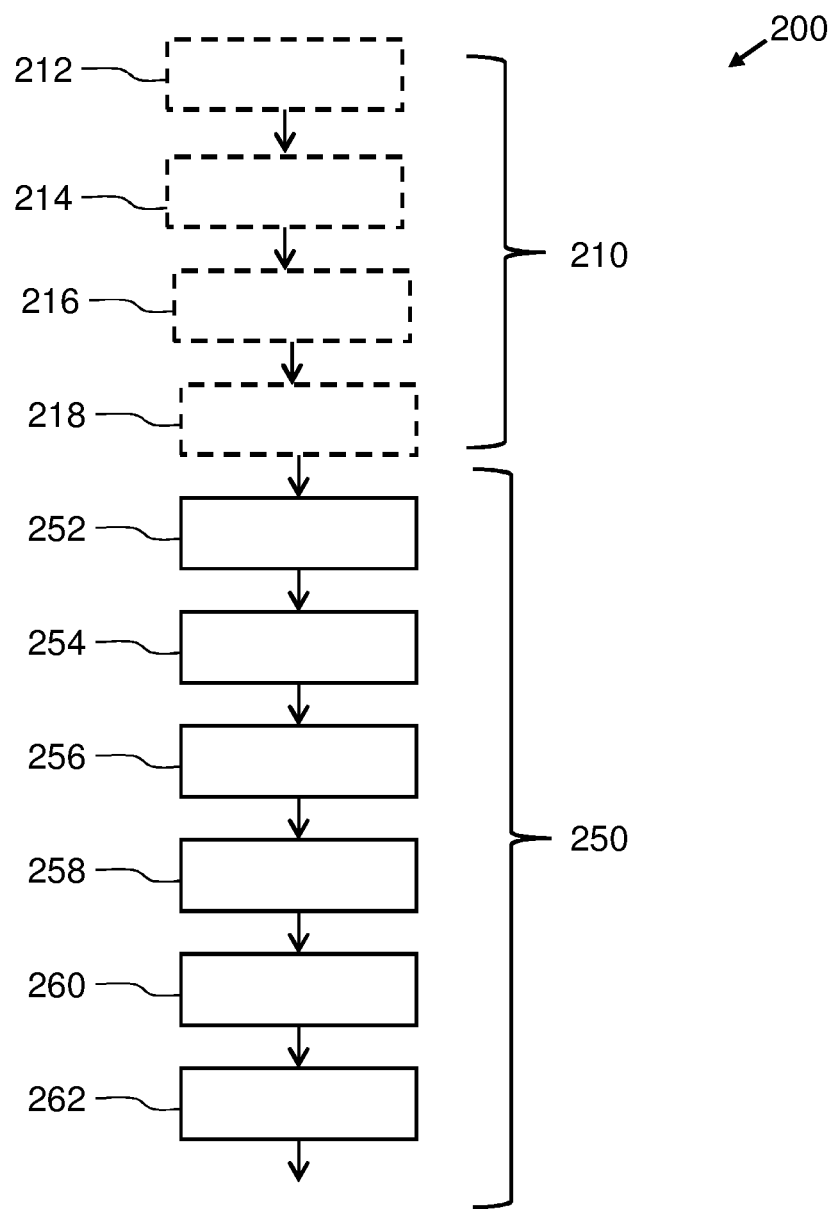
FIG. 2 schematically shows a method of protecting a lighting device against theft.

FIG. 2 schematically shows an embodiment of a method 200 of protecting a lighting device against theft. The presented method is subdivided into two different sub-procedures. A first procedure 210 is the above discussed commissioning procedure. A second procedure 250 is the above discussed procedure that relates to powering up the lighting device. Several steps of the method 200 are drawn with a dashed line, which indicates that these steps are not essential.

The method 200 of protecting a lighting device against theft at least comprises the steps of: a) obtaining 252 knowledge at the at least one other device that the lighting device is powering up, b) retrieving 254 from a second data storage of the at least one other device a verification value of the lighting device, c) transmitting 256 the retrieved verification value via the network to the lighting device, d) receiving 258 the transmitted verification value via the network at the lighting device, e) assessing 260 the received verification value in relation to a unique value for determining whether the lighting device is known to the lighting system, the unique value is associated with the lighting device and is stored in a first data storage of the lighting device, f) controlling 262 the lighting device in a first operational mode or in a second operational mode on basis of the assessment of the received verification value. It is to be noted that FIG. 2 presents the steps in a specific order, however, the invention is not limited to such a specific order.

In the commissioning procedure 210 of the method 200 specific steps may be executed such as: i) receiving 212 at the lighting device from a commissioning device a secret value, ii) assessing 214 the received secret value with a secret stored in the first data storage of the lighting device, and when the received secret value reveals that the commissioning device or a user of the commissioning device is aware of the secret: iii) transmitting 216 the unique value or a value that is directly obtained from the unique value from the lighting device to another device of the lighting system, and iv) storing 218 the unique value or the value that is directly obtained from the unique value at the other device.

It will be appreciated that the invention also extends to computer programs, particularly computer programs on or in a carrier, adapted for putting an embodiment of the above discussed method into practice. The program may be in the form of source code, object code, a code intermediate source and object code such as partially compiled form, or in any other form suitable for use in the implementation of the method according to this disclosure. It will also be appreciated that such a program may have many different architectural designs. For example, a program code implementing the functionality of the method or the functionality of the system according to the disclosure may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to functions of each of the features of at least one of the systems and/or devices set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

In the following of the document other embodiments are discussed without presenting a figure for these embodiments. A method and apparatus is provided to deter the theft of lamps (which are embodiments of lighting devices), for example, Light Emitting Diode lamps, by allowing the lamp to be rendered only partially functional if utilization is attempted in a non-authorized network of a non-authorized lighting system.

The features are as follows:
(i) The lighting device has a plurality of operational modes, including at least a second operational mode that renders its lighting performance to be sub-optimal. This may be achieved through the lack of ability to produce light, or in less extreme cases a restriction of key attributes such as brightness or color, or a non-practical modulation such as flashing. This actually means that the lighting device is not operated according to its full functionality, thus, operated according to a reduced functionality.
(ii) The lighting device enters the second operational mode by being placed in the non-authorized network of the non-authorized lighting system where it is not known. Put in another way, in order to use the lighting device in a first operational mode (which is a mode in which it is able to operate according to its full functionality) a lighting device's internal unique value must also be held elsewhere in the system on a second data storage, and the lighting device's unique value must be validated as matching the value stored in the second data storage. Should this not be possible, then the lighting device is placed in the second operational mode.
(iii) If a lighting device is operated in the non-authorized network, and thus been placed in the second operational mode, it can regain unrestricted use by either being placed back in the authorized network of an authorized lighting system or by being bound, commissioned, to a non-authorized network such that the non-authorized network becomes an authorized network. Binding to a new network may require the input of confidential information such as the input of a secret value or key via a commissioning device.

The general concept for an apparatus and method to deter the theft of a lighting device may be explained as follows:

At least one lighting device including a data storage is provided. A unique value relating the lighting device and is stored in the (non-volatile) data storage. At least one other connected device containing a lookup table stored on another data storage (examples of Other Connected Devices are a second lighting device, a smart light switch or a wireless bridge) is also provided. An operational mode value is held in the data storage on the lighting device that describes the lamp's state, and having associated with it a specific operational mode: a second operational mode restricts the lighting conditions to a sub-optimal state ("Restricted State"). A commissioning device may also be provided (e.g. a user device, such as a smartphone). Software is present either on the lighting device or the other device that is able to communicate with the commissioning device and also to modify the lighting device operational mode. Whereby: a lighting device is sold with its initial state being the second operational mode. A method for the lighting device that is placed for the first time into the lighting system or is connected for the first time to the network and which is powered on is as follows: the software of the commissioning device requests the user to provide an identification code (which might be interpreted as: the user provides a secret code), for example, via a software application running on the commissioning device. If the entered code matches the unique value of the lighting device or matches another secret code stored in the data storage of the lighting device, the unique value is added to the lookup table on the other device and the operational mode of the lighting device is changed to be a first operational mode in which the lighting device may operate according to its full functionality. The method for all subsequent moment that the lighting device is powered on is as follows: on power-on the software of the lighting device ascertains the unique value of the lighting device, the software compares the unique value to values stored on the other device. If the Unique Lamp ID is present, the Protected Lamp can be operated in the first operational mode. If the Unique Lamp ID is not present the Protected Lamp enters the second operational mode.

In the case where more than one other devices are present, or if the lighting system comprises a single lighting device and a single other device that has also characteristics of the lighting device and when both device may fulfill the role of the lighting device and the role of the other device in the lighting system; then the lookup tables on all the devices that store the unique values are synchronized; with modifications only made as additions and not as subtractions.

With this basic system, in the case where both the lighting device and the other device are stolen then, despite being stolen, the Software would authorize the lighting device to be used in the first operational mode. Hence, one of the following two additional measures may be implemented to achieve the desired level of security. The choice of measure likely being governed by the presence of an internet connection or not:
(i) The number of other devices, and therefore lookup tables storing the unique values, is be restricted to one, with a suitable choice being a part of the system less likely to be stolen, for example a wireless bridge or smart light switch fixed to a wall.

(ii) If the network of the lighting system has a connection to the internet (or other such network with similar properties) then the entry for each lighting device on the lookup table stored on the other device could be expanded to include unique network value such as the IP address of the connection and/or the Basic Service Set Identification (BSSID) number of the router. In this case the process for first power-on of the device may be modified to: The controlling requests the user to provide an identification code, for example, via a software application running on the commissioning device. If the entered code matches the unique value or another secret stored in the data storage of the lighting device, the unique value is added to the lookup table on the other device and the software polls the router to which the lighting device is connected to ascertaining its IP address and/or BSSID; subsequently, the software appends the router's IP address and/or BSSID to the lookup table stored on the other device, the operational mode of the lighting device is changed to be an unrestricted state. The process for subsequent times the lighting device is powered on would be modified to the following: on power-on the software ascertains the unique value of the lighting device, the software compares this value to values stored on the other device. If not present, the lighting device is placed into the second operational mode and, if present, the software polls the router to which the lighting device is connected to ascertaining its IP address and/or BSSID. Subsequently, the software checks these values against stored information and, if the IP address matches the last known IP address and/or the BSSID matches the last known BSSID address, the operational mode of the lighting device remains the first operational mode. A potential variation is that the values would only have to match any previously recorded IP address or BSSID for the lighting device to remain in the first operational state, if no match is found the lighting device is placed in the second operational mode). In the case that a check of IP address or BSSID is required then the software may also require to run a periodic check of the unique network value in order to ensure it is comparing to a current list. Should the lighting device be in the second operational mode the only possible way to enter the first operational mode is via the following process: the user provides a code to the software, for example, via a software application running on the commissioning device. If the entered code matches the unique value of the lighting device (or matches a secret stored on the data storage of the lighting device) then the unique value is added to the lookup table on the other device. Optionally, the software could change the lamp's last previously known operational mode.

Possible Enhancements are:

To provide a simpler set up process the following enhancements may be considered:

(i) The lighting device could also hold a Boolean value in (non-volatile) data storage of the lighting device to indicate whether it has previously been operated or not. The value of this operator would be set to True before the lighting device was sold. On the first instance of being powered on the value would change to False. If the software identified a lighting device being inserted in the lighting system or being connected to a network with a True value it could circumvent the registration process and automatically add the unique value of the lighting device (and possibly any other required values) to the lookup table on the other device.

(ii) A variable level of authentication being required of the user would also be possible. For example, if a system contained several lamps and also internet connectivity, boundary conditions could be applied comprising levels of change of identified lamps in the system, the amount of variation in the network-identifying information etc. These boundaries could then have different levels of authentication required, for example, minor changes could require no user input at all, medium levels of change could require a simple code word and greater levels of change could require a product code to be entered.

(iii) Information could also be stored about typical use of the lamp, for example when it is used, configuration etc.

(iv) An intermediate code or a secret (such as a PIN code) could be associated with the unique value of the lighting device and potentially modified by the user. This could make the code more memorable for the user.

(v) A smartphone application, protected by a password, could be associated with the unique value of the lighting device, meaning that to recover the lighting device the user need only open the smartphone application and have the application communicate with the software.

In summary, a lighting system and a method of protecting a lighting device of a lighting system against theft are provided. The lighting system comprises a lighting device and another device. Both the lighting device and the at least one other device comprises a data storage, a controller and a network interface. The lighting device additionally comprises a light emitter. When the lighting device powers up, the other device transmits a verification value stored in its data storage to lighting device. The lighting device assesses the verification value in relation to a unique value stored in its data storage to check whether the lighting system knows the lighting device. In dependence of the assessment, the lighting device is controlled to operate in a first or in a second operational mode. In a commissioning procedure the other device may receive the verification value for storage in its data storage.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A lighting system comprising a lighting device and at least one other device, the lighting device comprising a light source for emitting light, a first controller for operating the lighting device and for controlling a light emission of the light source, the first controller being configured to operate the lighting device in a first operational mode and to operate the lighting device in a second operational mode, a first data storage storing a unique value associated to the lighting device, a first network interface for connecting to a network and for allowing the first controller to communicate with the at least one other device, the at least one other device comprising a second data storage for storing verification values which relate to devices of the lighting system the stored verification values representing a list of devices known by the lighting system, a second controller, a second network interface for connecting to the network and for allowing the second controller to communicate with devices being connected to the network, wherein the first controller is configured to, at powering up of the lighting device, i) receive via the first network interface a verification value from the at least one other device, ii) assess the verification value in relation to the unique value stored in the first data storage for determining whether the lighting device is known to the lighting system, and iii) control the lighting device in the first operational mode or in the second operational mode on basis of the assessment, wherein the second controller is configured to a) determine whether the lighting device is powering up and, when the lighting device is powering up, to b) retrieve the verification value of the lighting device from the second data storage and c) transmit the retrieved verification value to the lighting device via the second network interface.

2. A lighting system according to claim 1, wherein the first controller is further configured to, while the lighting device is in a commissioning procedure for commissioning the lighting device to the lighting system, transmit the unique value or a value that is directly obtained from the unique value to the at least one other device, and the second controller is further configured to receive via the second network interface the transmitted unique value or the value that is directly obtained from the unique value and store it in the second data storage.

3. A lighting system according to claim 2 further comprising a commissioning device, wherein
the first controller is further configured to store in its data storage a secret,
the first controller is further configured to, while the lighting device is in the commissioning procedure, i) communicate with the commissioning device to receive a proof that a user of the commissioning device or the commissioning device knows the secret, and, only when the proof has been received, ii) transmit the unique value or the value that is directly obtained from the unique value to the at least one other device.

4. A lighting system according to claim 2, wherein the first controller is further configured to, when the lighting device is installed for the first time in the lighting system, automatically start the commissioning procedure.

5. A lighting system according to claim 3 comprising the commissioning device, the commissioning device, comprising a user interface for receiving, during the commissioning procedure, the secret from the user, and comprising a third network interface for transmitting the received secret to the lighting device.

6. A lighting system according to claim 1, wherein the network has a network identity or alternatively the lighting system further comprises a central device having a device identity, wherein comprising a network or a central device, wherein
the first controller is further configured to store in the first data storage a unique network value which relates to the network identity or to the device identity of the central device,
the first controller is further configured to, while the lighting device is powering up, i) receive via the first network interface a received network value, ii) assess the received network value in relation to the unique network value for determining whether the lighting device knows the lighting system and iii) control the lighting device in the first operational mode or in the second operational mode on basis of the assessment of the verification value and on basis of the assessment of the received network value.

7. A lighting system according to claim 6, wherein the received network value is one of: a network name, an address used to identify the network, an address of a central device of the network, and a name of the central device of the network.

8. A lighting system according to claim 6, wherein the first controller is further configured to, while the lighting device is in a commissioning procedure for commissioning the lighting device to the lighting system, i) receive via the first network interface the unique network value, and ii) store the unique network value in the first data storage.

9. A lighting system according to claim 1, wherein the first controller is further configured to, while the lighting device is powering up, to transmit via the first network interface information to the at least one other device that the lighting device is powering up, and, optionally, the information comprises a request to provide the verification value in response to the reception of the information.

10. A lighting system according to claim 1 comprising a second other device, the second other device comprising
a third data storage for storing verification values which relate to devices of the lighting system, the stored verification values representing the list of devices known by the lighting system,
a third controller,
a fourth network interface for connecting to the network and for allowing the third controller to communicate with devices being connected to the network, wherein
the second controller and the third controller are both configured to synchronize the list of stored verification values in, respectively, the second data storage and the third data storage.

11. A lighting system according to claim 1, wherein, if the lighting device is known to the lighting system, then the verification value is equal to or directly obtainable from the unique value, or the verification value is part of a zero-knowledge protocol used by the lighting device and the at least one other device wherein the zero-knowledge protocol is used to proof that the at least one other device has knowledge that relates to the unique value.

12. A lighting system according to claim 1, wherein the first operational mode comprises operating the lighting device in accordance with full functionality of the lighting device, and wherein the second operational mode comprises operating the lighting device in accordance with a reduced functionality.

13. A lighting system according to claim 12, wherein the reduced functionality comprises at least one of: a limited range of emitted light intensities compared to the range of light intensities which the lighting device may emit with full functionality, a limited range of emitted colors of light compared to the range of colors of light which the lighting device may emit with full functionality, a predefined specific pattern of emitted light intensities, a predefined specific pattern of emitted colors of light, no light emission, a limited access to the first data storage and/or another memory of the lighting device and a reduced operational speed for the first controller.

14. A method of protecting a lighting device of a lighting system against theft, the lighting system comprising the lighting device and at least one other device, the lighting device is connectable to the at least one other device via a network, the method comprises the steps of:
- obtaining knowledge at the at least one other device that the lighting device is powering up,
- retrieving from a second data storage of the at least one other device a verification value of the lighting device,
- transmitting the retrieved verification value via the network to the lighting device,
- receiving the transmitted verification value at the lighting device,
- assessing the received verification value in relation to a unique value for determining whether the lighting device is known to the lighting system, the unique value is associated with the lighting device and is stored in a first data storage of the lighting device,
- controlling the lighting device in a first operational mode or in a second operational mode on basis of the assessment of the received verification value.

15. A computer program comprising instructions stored in a non-transitory memory unit for causing a processor system to perform the method of claim 14.

* * * * *